Patented June 17, 1924.

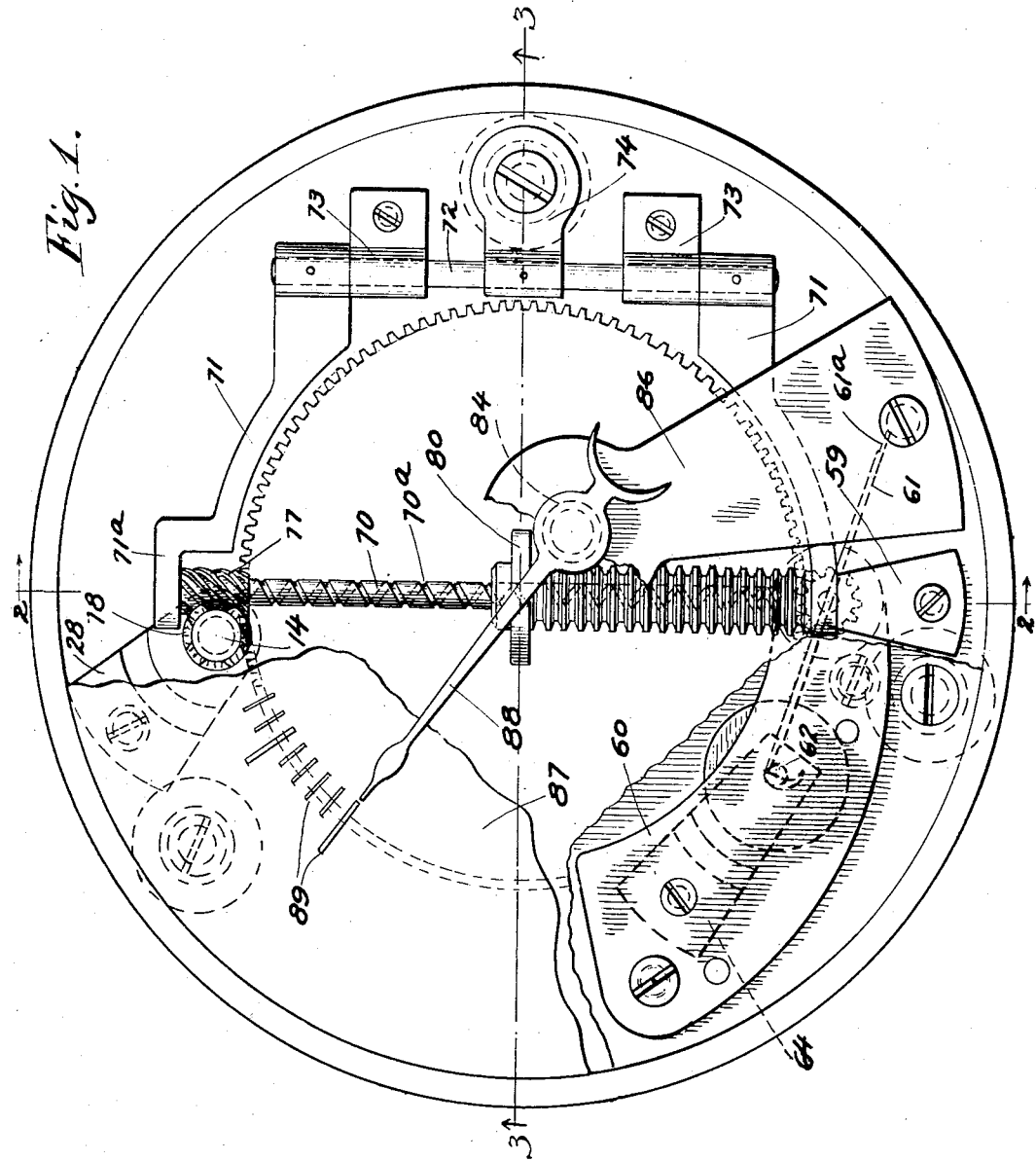

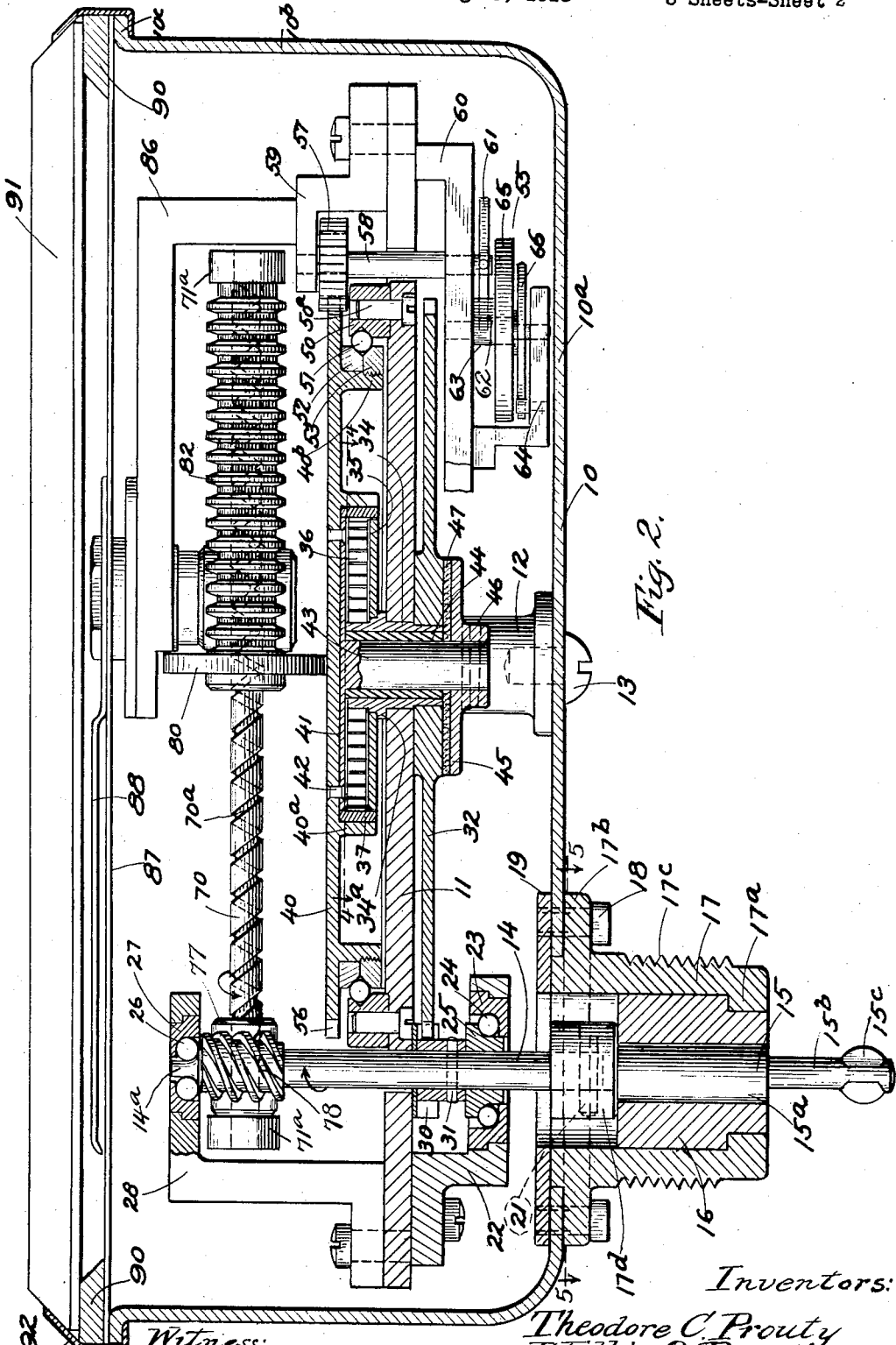

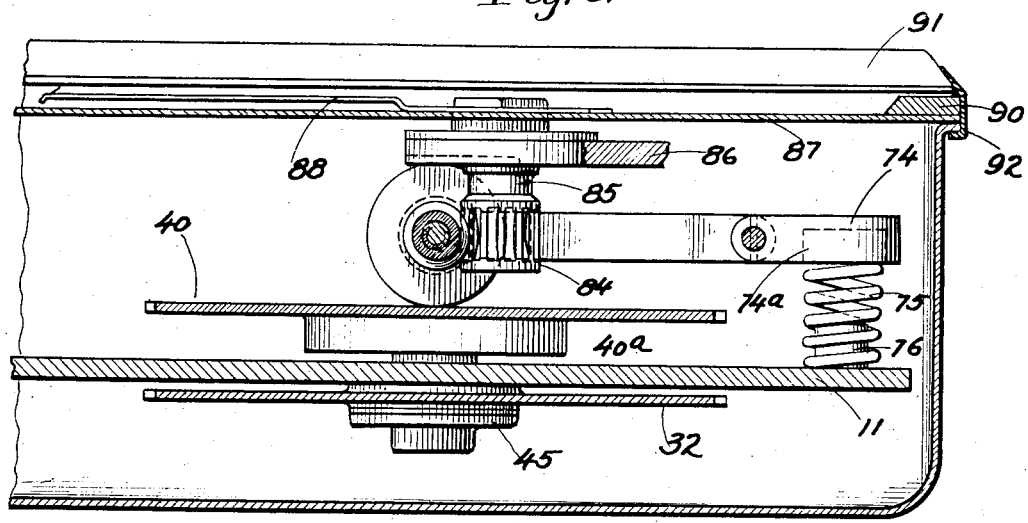
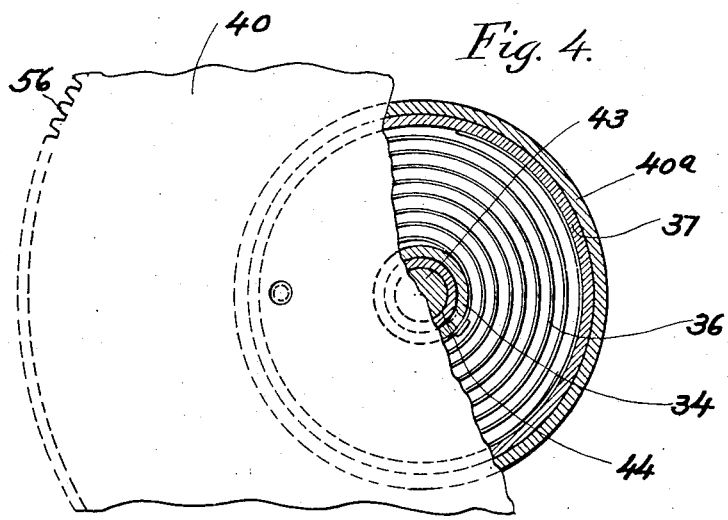
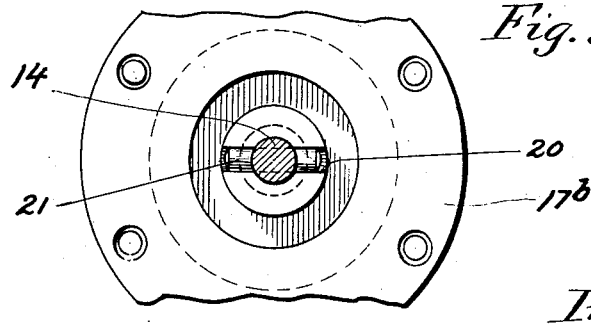

1,497,874

UNITED STATES PATENT OFFICE.

THEODORE C. PROUTY AND WILLIS O. PROUTY, OF ELGIN, ILLINOIS, ASSIGNORS, BY MESNE ASSIGNMENTS, TO PATENTS HOLDING CORPORATION, OF CHICAGO, ILLINOIS, A CORPORATION OF DELAWARE.

INDICATING DEVICE.

Application filed August 1, 1918. Serial No. 247,729.

*To all whom it may concern:*

Be it known that we, THEODORE C. PROUTY, a citizen of the United States, residing at Elgin, in the county of Kane and State of Illinois, and WILLIS O. PROUTY, a citizen of the United States, residing at Elgin, in the county of Kane and State of Illinois, have invented certain new and useful Improvements in Indicating Devices, of which the following is a specification.

This invention relates to an indicating device, and the improvement may be embodied in speedometers, tachometers, rotation counters, and similar instruments for use with automobiles, aeroplanes, and other machines.

The purpose of the invention is to provide an indicating device operating on a new principle for indicating accurately variations in speed and the like. The principal object of the invention is to provide an indicating device of the kind referred to embodying two driven elements having different laws of movement and having coacting parts adapted to cause a change in the relative positions of the elements to be effected by a change in their relative speeds.

In the embodiment of the invention herein described and illustrated, we provide a shaft which is rotated with a speed proportional to the speed of the automobile shaft, and which carries a disc normally adapted to remain in fixed position thereon, but arranged to move longitudinally. In combination therewith a second disc is provided to coact frictionally with the first disc and drive the same, the second disc being driven according to a different law of movement, preferably having a substantially constant speed of rotation, so that when the linear speeds of the coacting parts of the two discs are the same, no change in the position of the first disc on the second disc will occur. When the speed of the variable speed shaft changes, the connection thereof with the first disc causes this disc to move outwardly on the second disc to a path of larger radius, wherein the second disc drives the first disc with increased angular velocity corresponding to the increased angular velocity of the variable shaft. By connecting indicating mechanism to the movable disc, the changes in the speed of the variable shaft and the speed thereof at any given instant can be indicated or recorded. The second disc, having a substantially constant velocity, is preferably driven from the shaft of the automobile but is controlled by governing mechanism to give it a uniform or an invariable intermittent movement not subject to the variations in the speed of the automobile shaft.

These and other objects of the invention will be understood from the following specification, taken in connection with the accompanying drawings, in which the invention is shown embodied in a speedometer.

In the drawings—

Figure 1 shows a top plan view of the invention;

Fig. 2 shows an enlarged sectional view taken on the line 2—2 of Fig. 1;

Fig. 3 shows a sectional view taken on the line 3—3 of Fig. 1;

Fig. 4 shows a sectional view taken on the line 4—4 of Fig. 2, looking in the direction of the arrows; and Fig. 5 is a sectional view taken on the line 5—5 of Fig. 2, looking in the direction of the arrows.

In the drawings the speedometer is shown as comprising a casing 10 having a base portion 10$^a$, an annular wall 10$^b$, and an annular flange 10$^c$ around the upper edge of the annular wall, these parts preferably being formed as an integral construction. A supporting table or frame member 11 is mounted within the casing 10 upwardly from the base thereof, on which it is carried by means of posts 12 which are connected to the base and to the table by means of screws 13. The speedometer mechanism is carried by the table 11 and is driven through a shaft 14, which forms an extension of the shaft 15 through which a connection is formed with the automobile shaft, or other member, the speed of which is to be determined. The shaft 15 has an enlarged portion 15$^a$ which is journalled in a bearing member 16 mounted within the sleeve 17, in which it is supported by an annular shoulder 17$^a$ engaging the annular recess on the lower end of the bearing member. The sleeve 17 carries an annular flange 17$^b$ at its upper end which surrounds the aperture in the base of the casing into which the upper end of the sleeve extends. and this annular flange is secured to the casing by means of bolts or screws 18 which pass through the casing and into a plate or washer 19. The lower end of the shaft 15 is reduced in diameter, as shown at 15$^b$, and the extremity of this portion is provided with a coupling connection 15$^c$ by which the shaft can be connected to a flexible shaft extending to the shaft of the automobile, or the like. The sleeve 17 is threaded on its outer side, as shown at 17$^c$, to be engaged by suitable connecting means associated with the flexible shaft, or the like.

The upper end of the shaft 15 carries a hub or block 17$^d$ having a transverse slot 20 extending downwardly from the upper end thereof, and is further provided with a cylindrical axial recess to be closely fitted by the lower end of the shaft 14, which has a transverse pin 21 fixed therein to engage the slot 20 so that a driving connection is formed between the shaft 15 and the extension 14 thereof. A bracket 22 is secured to the table 11 and offset downwardly therefrom to support the collar 23 which forms a raceway for the balls 24, upon which is seated the collar 25 fixed on the shaft 14, so that a roller bearing is formed to support the shaft and receive the downward thrust thereon. The upper end of the shaft 14 is reduced in diameter, as shown at 14$^a$, to form a seat for the balls 26, which are adapted to run within the raceway formed by the collar 27 which is secured to a bracket 28 carried on the upper side of the table 11. The shaft 14 serves as a driving member for both the variable element of the indicating device and for the element having a substantially constant or invariable intermittent motion.

The connection for driving the disc having a regular intermittent motion comprises a pinion 30 secured to the shaft 14 between the bracket 22 and the table 11 by means of a pin 31, and arranged to drive a relatively large gear 32 which is fixed on a sleeve 34 journalled in an aperture formed in the central portion of the table 11 and supported thereon by means of an annular flange 34$^a$ which engages the upper surface of the table. The flange 34$^a$ also carries a plate 35, above which is mounted a coil spring 36 having the inner end thereof attached to the sleeve 34, and having the outer portion thereof coacting frictionally with an annular collar or sleeve 37 which fits securely within an annular depending flange 40$^a$ formed on the under side of the large friction disc 40. The disc 40 is in turn secured to a plate 41 by means of rivets 42, and the plate 41 has formed integrally therewith a stub shaft 43 which is journalled within a bushing 44 mounted within the sleeve 34, previously described. A plate or collar 45 is secured to the lower end of the shaft 43 by means of a pin 46, and a washer 47 is inserted between this collar and the hub of the gear 32. It will be seen that as the gear 32 rotates, the sleeve 34 connected thereto will wind up the spring 36, and at the same time this spring will impart a rotary movement to the disc 40 by reason of the frictional engagement thereof with the annular collar 37, so that the variable energy transmitted to the gear 32 from the driving shaft 14 will be stored up by the spring 36, which in turn will distribute the stored up energy at a substantially uniform rate and drive the disc 40. The disc 40 is supported adjacent the outer periphery thereof by means of a ball-bearing comprising an annular grooved collar 50 secured to the table 11 by screws 50$^a$ to form a raceway for the balls 51, which in turn coact with the inner raceway formed by the collars 52 and 53 carried by the depending flange 40$^b$ formed on the under side of the disc. The lower collar 53 preferably has a screw-threaded engagement with the flange 40$^b$, so that it can be removed when desired.

The disc 40 is controlled, in order to give it a substantially regular intermittent motion of uniform velocity, by means of governing mechanism, designated generally by the numeral 55. This mechanism is connected directly to the disc 40, which has gear teeth 56 formed on the periphery thereof to mesh with the teeth of a pinion 57 fixed on a shaft 58. This shaft has its upper end journalled in a bracket 59 carried by the table 11, and the lower end thereof is journalled in another bracket 60 secured to the underside of the table. The rotation of the shaft 58 is controlled by a stop arm 61, which extends through the lower projecting end of the shaft 58 and is secured thereto with equal portions projecting on opposite sides of the shaft. The ends of the stop arm 61 are made relatively thin, as shown at 61$^a$, and are adapted to engage a stop 62, in the shape of a curved vane, which is carried by the shaft 63. This shaft has its lower end journalled in a plate or bracket 64. A balance wheel or disk 65 is fixed on the shaft 63 above the plate 64, and the oscillatory movement of this balance wheel is controlled by a hair spring 66, as in the ordinary watch construction. At each limit of the oscillatory movement of the shaft 63, one end of the stop arm 61 is released by the stop 62, thus permitting the shaft 58 to rotate and permit power to be applied to the escapement mechanism. At the end of each half revolution of the shaft 58, one of the extremities of the stop 61 engages the stop 62 thus applying power to the escapement mechanism and at the same time bringing the shaft 58 momentarily to rest. In this way, the disc 40 is caused to have a regular intermittent motion due to the operation of the escapement mechanism so that the variable energy transmitted to the spring 36 is stored up and released through the substantially uniform intermittent motion of the disc.

The other train of mechanism, which moves with a variable speed directly responsive to the variations in the speed of rotation of the shaft 14, comprises a screw threaded horizontal shaft or spindle 70, which has the ends thereof journalled in the parallel portions 71ª of two pivotally mounted arms 71. These arms 71 are fixed on a rock shaft 72 journalled in bearing members 73 which are spaced apart and secured to the table 11. An arm or lever 74 is fixed to the middle portion of the rock shaft 71, and the under side thereof is provided with a recess 74ª which forms a seat for a coil spring 75, the lower end of which is secured in position on the table 11 by means of an upwardly projecting pin 76. The shaft 70 has a worm 77 fixed to one end thereof to mesh with a worm gear 78 which is fixed upon the upper end of the shaft 14, so that the rotary motion of the driving shaft is imparted to the horizontal shaft 70 while the speed of rotation is at the same time reduced.

A friction disc 80 is mounted upon the shaft 70 and provided with an internal screw thread adapted to engage the spiral groove 70ª of the shaft 70. The disc 80 is made relatively wide, and the peripheral surface thereof is adapted to coact with the upper surface of the disc 40. The pivotal mounting of the shaft 70 permits the coil spring 75 to maintain a firm frictional contact between the two discs, so that as the disc 40 is rotated with an invariable intermittent motion, as previously described, this motion is imparted to the disc 80 when the latter is at some point removed from the exact center of the disc 40, which central position is that occupied by the disc 80 when the parts of the speedometer are at rest. The disc 40 cannot drive the disc 80 when the latter is located at the central or zero position, but as soon as the shaft 70 begins to rotate, the screw-threaded engagement thereof with the disc 80 causes the latter to move to the left, as viewed in Fig. 2, to a point displaced from the center of the disc 40. The disc 80 will then be driven by the disc 40 with a speed dependent upon its distance from the center of the larger disc, and when the angular velocity of the disc 80 equals that of the shaft 70, the longitudinal movement of the disc 80 ceases and it rotates in unison with the shaft as long as the angular velocity of the shaft remains constant. If the speed of the shaft 14 and of the shaft 70 then increases, causing the driven disc 80 to lag behind the shaft 70, the threaded connection will force the driven disc farther from the center of the driving disc until the driving radius of the disc 40 is sufficient to rotate the disc 80 with an angular velocity equal to the increased angular velocity of the shaft 70. If the speed of the shaft 70 decreases, the disc 80 automatically moves to the right, as viewed in Fig. 2, until it again rotates in unison with its shaft. It will be seen that the linear speeds of the contacting parts of the two discs must be the same and if the speed to be indicated is either increasing or decreasing, these linear speeds are unequal and a relative movement of the discs takes place. The disc 80 thus moves longitudinally on the shaft 70 with each change of speed of the driving shaft 14, and, if the disc 80 be connected to suitable indicating mechanism, the variations in speed of the shaft 14 and of the automobile shaft connected thereto may be indicated or recorded.

For this purpose an annular rack bar 82 is fixed to the disc 80 and journalled on the shaft 70, being arranged to extend to the end of the shaft 70 opposite the shaft 14 when the disc 80 is in its normal position at the center of the disc 40. This annular rack bar rotates with the disc 80 and meshes constantly with a pinion 84 carried by the shaft or arbor 85, which is journalled in a bracket 86 carried by the table 11. This shaft extends upwardly through a dial 87, seated upon the annular flange 10ᶜ of the casing, and has secured thereto a pointer 88 which is adapted to move over the graduated scale 89 printed on the dial 87 concentrically with the axis of rotation of the pointer. A bezel 90 seats upon the outer edge of the dial 87 and supports the cover plate 91, all of which parts are secured to the casing 10 by means of an annular retaining ring 92.

The shaft 14, which is connected through the shaft 15 to a suitable moving part of the automobile mechanism, rotates with a speed which is constantly proportional to the speed of the vehicle, and this variable speed is transmitted constantly to the shaft 70 which at all times rotates at a proportional speed which is reduced by means of the worm 77 and worm gear 78. Since the linear speed of any portion of the upper surface of the disc 40 depends upon the distance of that proportion of the surface from the center of the disc, it follows that the center of the disc 40 will have no linear velocity, while the linear velocity of points outward from the center of the disc will increase as the outer edge of the disc is approached. This disc 80, which is driven by the disc 40, has an angular velocity dependent upon its distance from the center of the disc 40; and, if this angular velocity is the same as that of the shaft 70, the disc 80 and the shaft 70 rotate in unison. When the speed of rotation of the shaft 70 changes, however, so that it is either greater or less than that of the disc 80, the screw-threaded driving connection between the shaft and the disc 80 causes the latter to move laterally on the shaft 70 until it reaches a position wherein its angular velocity again coincides with that of the shaft 70. The disc 80 always moves to a point where the surface velocities of the two discs agree. In this way the disc 80 is directly responsive to all changes in the speed of rotation of the shaft 14, and these changes are instantly recorded on the dial by the pointer 88. By this novel construction the variable speed of the vehicle is measured by comparing the speed of an element having a motion directly responsive to that variable speed with another element having a speed which is independent of that variable speed. Although the disc 40 is preferably driven from the same variable driving element as the shaft 70 and regulated by the governing mechanism to have a substantially constant or uniform movement, it will be apparent that the disc 40 may be actuated by separate driving means, if desired.

Although we have shown and described a single embodiment of the invention for purposes of illustration, it will be understood that the form of the invention and the application thereof may be varied widely without departing from the spirit of the invention as defined in the appended claims.

We claim:—

1. In a device for indicating the speed of a mechanism, a driving element driven at a speed proportional to the speed of said mechanism, a driven element, spring mechanism actuated by said driving element for driving said driven element, escapement mechanism for controlling the speed of said driven element, independent means connecting said driving element with said driven element and comprising a member arranged to change its position upon change in the relative speeds of said driving element and said driven element, an annular rack bar movable with said member, and indicating mechanism geared to said rack bar and operated thereby to indicate the speed.

2. In a device for indicating the speed of a mechanism, a disc, a second disc having its periphery contacting with the face of said first-named disc, means for driving said first-named disc at a speed independent of the speed of said mechanism, a spindle driven at a speed proportional to the speed of said mechanism and having a threaded engagement with said second-named disc, an annular rack bar mounted on said spindle and connected to said second-named disc, a pinion actuated by said rack bar, and indicating means actuated by said pinion.

3. In a device for indicating the speed of a mechanism, a disc, a second disc coacting with the peripheral surface of said first-named disc, resilient means for maintaining a driving frictional contact between said second-named disc and said first-named disc, a spindle having a threaded engagement with said first-named disc, means for driving said spindle at a speed proportional to the speed of said mechanism, an annular rack bar mounted on said spindle and connected to said first named disc, and indicating mechanism including a pinion meshing with said rack bar actuated by a change in the relative positions of said discs.

4. In a device for indicating the speed of a mechanism, a spindle, a pivoted frame in which said spindle is rotatably mounted, a worm mounted on said spindle, a worm wheel meshing with said worm, a driving shaft connected with said worm wheel and adapted to be driven with a speed proportional to the speed of said mechanism, a disc having threaded engagement with said spindle, a second disc for driving said first-named disc, means engaging said pivoted frame to maintain the peripheral surface of said first-named disc in contact with said second-named disc, means actuated by said shaft for driving said second-named disc, and an escapement mechanism for controlling the movements of said second-named disc.

5. In a device for indicating the speed of a mechanism, a spindle, means for driving said spindle at a speed proportional to the speed of said mechanism, a disc having a threaded engagement with said spindle, a second disc contacting on its lateral surface with the periphery of said first-named disc, means for driving said second-named disc at a speed independent of the speed of said mechanism, a gear movable with said second-named disc, a pinion meshing with said gear, a stop arm actuated by said pinion, and an escapement mechanism driven by said stop arm for controlling the movements thereof.

6. In a device for indicating the speed of a mechanism, a driving shaft driven with a speed proportionate to the speed of said mechanism, a rotatably mounted disc, means for storing up energy received from said driving shaft and imparting the same to said disc, said disc being provided with gear teeth, a shaft mounted adjacent said disc, a pinion fixed on said last-named shaft and meshing with the gear teeth of said disc, a stop arm secured to said last-named shaft, a pivotally mounted stop comprising an angular vane adapted to be engaged by the ends of said arm, and means comprising a balance wheel for controlling the oscillation of said stop.

7. In a device for indicating the speed of a mechanism, the combination of a driving element adapted to be driven with a speed proportional to the speed of said mechanism, a disc rotatively mounted in the device and provided with a spring housing, a rotatable element mounted concentrically with said disc, a coil spring connected with said element and frictionally engaging said spring housing, means operated by said driving element for actuating said rotatable element, a second disc mounted with its periphery engaging the surface of said first named disc, and means engaging said second named disc driven by said driving element to effect a change in the relative positions of said discs upon change in the speed of said mechanism, an annular rack concentric with said means and connected to said second named disc, gearing actuated by said rack, and indicating means operated by said gearing.

8. In a device for indicating the speed of a mechanism, a spindle, a driving shaft connected to said spindle and adapted to be driven with a speed proportional to the speed of said mechanism, a disc having a threaded engagement with said spindle, a second driving disc contacting on its lateral surface with the periphery of said first-named disc, a spring adapted to be wound up by the rotation of said shaft, means for effecting the rotation of said second-named disc by the unwinding of said spring, said second-named disc having gear teeth formed on the periphery thereof, a pinion adapted to mesh with said teeth, a stop arm actuated by the rotation of said pinion, and a clock escapement for controlling the rotation of said stop arm.

9. In a device for indicating the speed of a mechanism, the combination of a driving element adapted to be driven with a speed proportional to the speed of said mechanism, a disc rotatively mounted in the device and provided with a spring housing, a rotatable element mounted concentrically with said disc, a coil spring connected with said element and frictionally engaging said spring housing, means operated by said driving element for actuating said rotatable element, a second disc mounted with its periphery engaging the surface of said first named disc, means engaging said second named disc and driven by said driving element to effect a change in the relative positions of said discs upon change in the speed of said mechanism, a watch escapement connected to said first named disc for controlling the rotation thereof, an annular rack concentric with said means and connected to said second named disc, gearing actuated by said rack, and indicating means operated by said gearing.

10. In a device for indicating the speed of a mechanism, the combination of a driving element adapted to be driven with a speed proportional to the speed of said mechanism, a disc rotatively mounted in the device and provided with a spring housing, a rotatable element mounted concentrically with said disc, a coil spring connected with said element and frictionally engaging said spring housing, means operated by said driving element for actuating said rotatable element, a second disc mounted with its periphery engaging the surface of said first named disc, a spindle threadedly engaging said second named disc, means actuated by said driving element for operating said spindle with a speed proportional to the speed of said mechanism, an annular rack sliding on said spindle and connected to said second named disc, and means operated by said rack for indicating the speed of said mechanism.

11. In a device for indicating the speed of a mechanism, a frame, a driving shaft driven by said mechanism and journalled in bearings carried by said frame, a rotatable sleeve journalled in said frame, a shaft journalled in said sleeve, a disc mounted on the end of said shaft and provided with a spring housing on one side thereof, a coil spring having its inner end frictionally engaging the inner wall of said housing, means for forming a driving connection between said sleeve and driving shaft, a gear carried by said disc, an escapement mechanism driven by said gear for controlling the rotation of said disc, a spindle mounted parallel to the face of said disk, means forming a driving connection between said driving shaft and said spindle, said spindle being provided with a helical groove, an annular rack bar mounted on said spindle and having a part engaging said groove, a second disc secured to said rack bar with its periphery coacting with the face of said first-named disc, a pinion meshing with said rack bar, and indicating mechanism actuated by said pinion.

In testimony whereof, we have subscribed our names.

THEODORE C. PROUTY.
WILLIS O. PROUTY.